United States Patent
Ueda et al.

(10) Patent No.: US 8,614,848 B2
(45) Date of Patent: Dec. 24, 2013

(54) ELECTROCHROMIC ELEMENT AND METHOD OF FORMING SAME

(75) Inventors: Miki Ueda, Tokyo (JP); Shinjiro Okada, Kamakura (JP); Masaaki Shibata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 13/286,985

(22) Filed: Nov. 1, 2011

(65) Prior Publication Data

US 2012/0113496 A1 May 10, 2012

(30) Foreign Application Priority Data

Nov. 4, 2010 (JP) ................................. 2010-247858

(51) Int. Cl.
*G02F 1/153* (2006.01)
*G02F 1/15* (2006.01)

(52) U.S. Cl.
USPC .......................................... 359/275; 359/265

(58) Field of Classification Search
USPC ............... 359/265–275; 546/22, 256; 427/68; 29/592.1
See application file for complete search history.

(56) References Cited

U.S. PATENT DOCUMENTS

| | | | | |
|---|---|---|---|---|
| 5,631,765 A | * | 5/1997 | Baur et al. | 359/267 |
| 6,011,642 A | * | 1/2000 | Vink et al. | 359/273 |
| 7,428,090 B2 | * | 9/2008 | Fukazawa et al. | 359/265 |
| 8,289,607 B2 | * | 10/2012 | Valentin et al. | 359/265 |
| 8,368,991 B2 | * | 2/2013 | Yeh et al. | 359/265 |
| 8,368,993 B2 | * | 2/2013 | Yeh et al. | 359/273 |
| 8,384,983 B2 | * | 2/2013 | Yashiro et al. | 359/269 |

FOREIGN PATENT DOCUMENTS

JP     54-33745 A1     3/1979

* cited by examiner

*Primary Examiner* — Loha Ben
(74) *Attorney, Agent, or Firm* — Canon USA Inc. IP Division

(57) ABSTRACT

An electrochromic element includes a pair of transparent electrodes, and an electrolyte layer and an electrochromic layer disposed between the pair of transparent electrodes. Transmittance of light is changed by a voltage applied to the pair of transparent electrodes. The electrochromic layer includes a first electrochromic layer and a second electrochromic layer stacked upon each other. Both of the first and second electrochromic layers are made of titanium oxide. The first electrochromic layer is in contact with one of the pair of transparent electrodes. The second electrochromic layer is in contact with an electrolyte-layer side of the first electrochromic layer. A refractive index $n0$ of the transparent electrode in contact with the first electrochromic layer, a refractive index $n1$ of the first electrochromic layer, and a refractive index $n2$ of the second electrochromic layer satisfy the relationship $n0<n1<n2$.

5 Claims, 6 Drawing Sheets

ELECTROCHROMIC ELEMENT AND METHOD OF FORMING SAME

BACKGROUND OF THE INVENTION

1. Field of the Invention

The present invention relates to an electrochromic element and methods of forming an electrochromic element capable of controlling transmittance of light.

2. Description of the Related Art

Electrochromism is a phenomenon shown by materials in which a reversible electrochemical reaction is induced in response to a supply of voltage, which changes the absorption wavelength range of the material for visible light, as a result of which the material develops or loses a color. An electrochemically colored or bleached element using such an electrochromic phenomenon is referred to as an "electrochromic element". An electrochromic element can be used as a light adjustment (or light modulating) element for controlling transmittance of visible light. As used herein, the term "transmittance" is to be accorded its ordinary meaning, which can be loosely defined as the ratio of the light energy falling on a body to that transmitted through it. The term "visible light" refers to electromagnetic radiation in wavelengths ranging substantially within 350 and 850 nanometers (nm) inclusive.

FIG. 2 illustrates an example of the structure of an electrochromic element. As illustrated in FIG. 2, an electrochromic element 200 is constructed by sequentially stacking a transparent first substrate 1, a transparent first electrode 2, an electrochromic layer 3, an electrolyte layer 4, a transparent second electrode 5, and a transparent second substrate 6.

It is useful to configure a transmissive electrochromic element to suppress reflection of visible light on a boundary surface between layers included in the element. When visible light is reflected on a boundary surface between layers included in an element, the transmittance of the visible light transmitted through the element is low. Further, the light reflected from the boundary surface interferes with incident light, thereby causing a phenomenon of low transmittance of the visible light of a specific wavelength, i.e., wavelength dependence of visible light transmittance.

Reflectance R of light on a boundary surface between adjacent layers respectively having refractive indices n1 and n2 is given by Fresnel's formula expressed by:

$$R = (n1-n2)^2/(n1+n2)^2 \qquad \text{(EQUATION 1)}.$$

From EQUATION 1, it can be appreciated that as the difference between n1 and n2 increases, the reflectance increases. Accordingly, transmittance can be controlled by specifically designing refractive indices of adjacent layers in a given optical element.

Japanese Patent Application Laid-Open No. 54-33745 discusses reducing the reflectance on the boundary surface between the layers by selecting the materials of the adjacent layers such that an electrolyte layer and an electrode adjacent to an electrochromic layer have refractive indices close to the refractive index of the electrochromic layer. Since tungsten oxide has a refractive index of approximately 2.0 at a wavelength 550 nm, the adjacent layers also made to have refractive indices of values close to 2.0.

However, when an electrochromic element is prepared by an electrochromic material having a high refractive index, it is difficult to make the refractive index of a layer adjacent to the electrochromic layer from such a material that shows a refractive index close to the refractive index of the electrochromic layer. As a result, the reflectance on the boundary surface is increased, leading to a high possibility of interference of reflected light with indent light.

Titanium oxide is more transparent than tungsten oxide and other inorganic electrochromic materials. Accordingly, titanium oxide is attracting attention as an electrochromic material. However, titanium oxide has a high refractive index of approximately 2.5, and therefore it is not easy to reduce the reflectance only by relying on selection of a material of an adjacent layer of the electrochromic layer.

SUMMARY OF THE INVENTION

Embodiments of the present invention are directed to an electrochromic element including an electrochromic layer made of titanium oxide, having low reflectance on the boundary surface between layers included in the element and having low wavelength dependence of visible light transmittance.

According to an aspect of the present invention, an electrochromic element includes a pair of transparent electrodes, and an electrolyte layer and an electrochromic layer disposed between the pair of transparent electrodes. The electrolyte layer is disposed between the electrochromic layer and a first one of the transparent electrodes. Transmittance of transmitting light is changed by a voltage applied to the pair of transparent electrodes. The electrochromic layer includes a first electrochromic layer and a second electrochromic layer stacked upon each other. Both of the first and second electrochromic layers are made of titanium oxide. The first electrochromic layer is in contact with a second one of the transparent electrodes. The second electrochromic layer is in contact with an electrolyte-layer side of the first electrochromic layer.—When n0 represents a refractive index of the transparent electrode in contact with the first electrochromic layer, n1 represents a refractive index of the first electrochromic layer, and n2 represents a refractive index of the second electrochromic layer, a relationship n0<n1<n2 is satisfied.

According to the present invention, the electrochromic layer including a plurality of titanium oxide layers having different refractive indices, so that it is possible to reduce the reflected light generated on the boundary surface between the transparent electrode or electrolyte layer and the electrochromic layer, even if titanium oxide having a high refractive index is used for the electrochromic layer.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Titanium oxide is attracting attention as an electrochromic material, since its optical characteristic is less dependent on wavelength than those of tungsten oxide and indium oxide.

It is known that the refractive index of a titanium oxide layer can be controlled by controlling the density of the titanium oxide within the layer. However, finding the appropriate structure of the layer has proven to be a difficult task. An electrochromic element according to exemplary embodiments of the present invention includes a plurality of electrochromic layers, and the respective electrochromic layers are made of titanium oxide materials having different densities specifically formed so that refractive indices thereof satisfy predetermined (or desired) mathematica conditions.

The relationship between the refractive index and the density of a material is expressed by the following Lorentz-Lorenz equation. In other words, the refractive index of a titanium oxide layer is determined from the density of the titanium oxide constituting the layer.

$$A\rho=(n^2-1)/(n^2+1) \text{ (where "} n \text{" represents a refractive index, and "} A \text{" represents a constant number specific to a material)} \quad \text{(EQUATION 2)}$$

Assuming that "ρ1" and "n1" respectively represent the density and refractive index of a first electrochromic layer, "ρ2" and "n2" respectively represent the density and refractive index of a second electrochromic layer, and the density ρ1 is lower than the density ρ2 (ρ1<ρ2), the relationship (n1<n2) holds from the Lorentz-Lorenz equation.

Similarly in the following description of the exemplary embodiments, "ρ1" and "n1" respectively represent the density and refractive index of a first electrochromic layer. Further, "ρx" and "nx" respectively represent the density and refractive index of an x-th electrochromic layer (where "x" is an integer equal to or greater than 1).

The refractive index of the electrochromic layer according to the exemplary embodiments of the present invention is determined from the density of titanium oxide constituting the electrochromic layer. Determining the respective refractive indices of the plurality of electrochromic layers leads to a determination of the reflectance on the boundary surface between the electrochromic layers.

Therefore, it is possible to reduce the reflectance of visible light on the boundary surface between an electrochromic layer and a layer adjacent thereto by controlling the density of titanium oxide constituting the electrochromic layer.

Figure 1A:
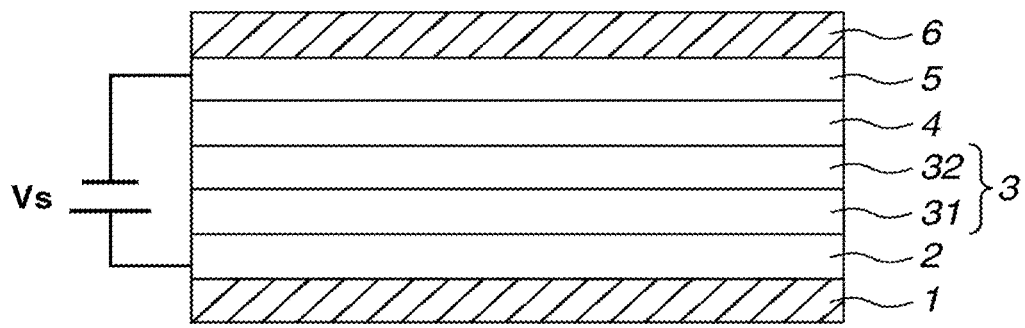
FIGS. 1A and 1B are conceptual diagrams illustrating the cross-sections of the structures of electrochromic elements according to exemplary embodiments of the present invention.
Figure 1B:
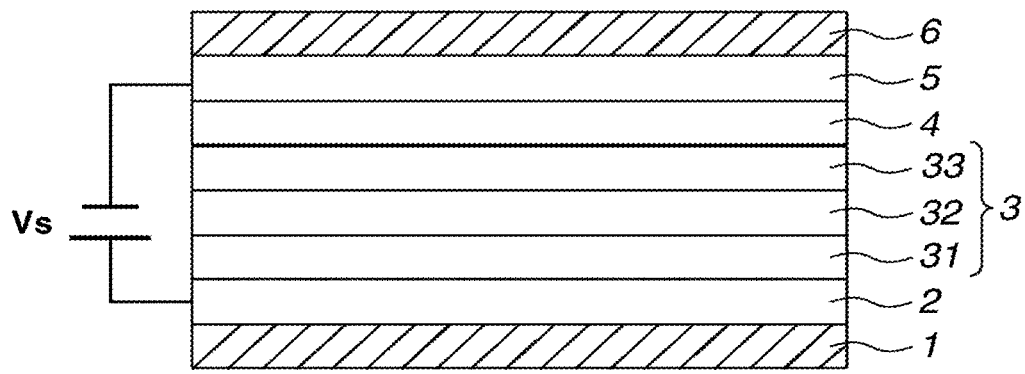
Figure 2:
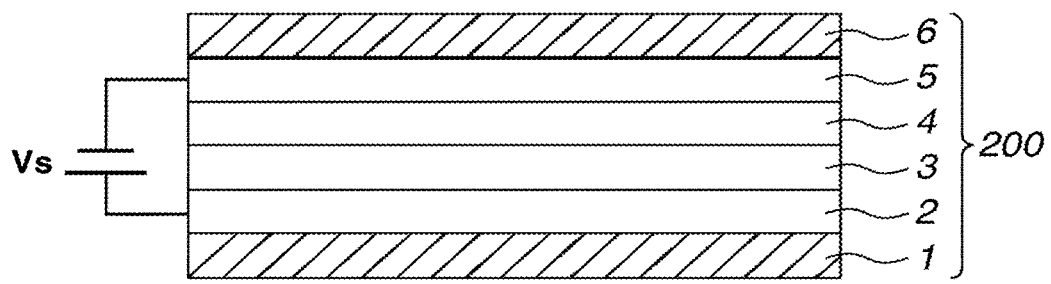
FIG. 2 is a conceptual diagram illustrating a structure of an electrochromic element.

A first exemplary embodiment will be described with reference to FIG. 1A. FIGS. 1A and 1B are cross-sectional views schematically illustrating examples of electrochromic elements according to the exemplary embodiments of the present invention.

The electrochromic element illustrated in FIG. 1A includes a first substrate 1, a first electrode 2, an electrochromic layer 3, an electrolyte layer 4, a second electrode 5, and a second substrate 6. The electrochromic layer 3 includes a first electrochromic layer 31 and a second electrochromic layer 32 stack upon each other. Transmittance of light is changed by a voltage applied to the pair of transparent electrodes (2 and 5). Specifically, in FIGS. 1A and 1B a voltage supply Vs is used for applying an appropriate voltage to the pair of transparent electrodes so as to induce an electrochromic effect in the electrochromic element.

The first substrate 1, the first electrode 2, the second electrode 5, and the second substrate 6 are made of transparent materials, respectively. The first substrate 1 and the second substrate 6 may be omitted, if necessary. The second electrochromic layer 32 is in contact with the electrolyte layer side of the first electrochromic layer 31.

The electrochromic layer of the electrochromic element according to the present exemplary embodiment includes the first electrochromic layer 31 in contact with the first electrode 2, and the second electrochromic layer 32 in contact with the first electrochromic layer 31. The densities and refractive indices of the respective electrochromic layers 31 and 32 satisfy the relationships of (ρ1<ρ2) and (n1<n2). Further, the refractive indices satisfy the relationship of (n0<n1<n2) where "n0" represents the refractive index of the first electrode 2; n1 represents a refractive index of the first electrochromic layer 31; and n2 represents a refractive index of the second electrochromic layer 32.

This means that the value of the refractive index of the first electrochromic layer 31 is a value between the value of the refractive index of the first electrode 2 and the value of the refractive index of the second electrochromic layer 32.

Therefore, the value of the refractive index of the first electrochromic layer 31 is closer to the value of the refractive index of the first electrode 2 than the value of the refractive index of the second electrochromic layer 32.

Accordingly, the reflectance on the boundary surface between the first electrode 2 and the electrochromic layer 3 becomes lower when the electrochromic layer 3 includes the first electrochromic layer 31 and the second electrochromic layer 32.

Reducing the reflectance on the boundary surface between the electrochromic layer 3 and the first electrode 2 is effective, since this can increase the transmittance of visible light through the electrochromic element, and can prevent interference of reflected light with incident light.

The first electrochromic layer 31 according to the present exemplary embodiment has a layer thickness thinner than that of the high density second electrochromic layer 32.

Generally, manufacturing a low density layer takes a longer time and requires a greater care compared to manufacturing a high density layer in such a manner that, for example, layer formation rate of a low density layer slows down in a reactive sputtering process. The present exemplary embodiment remains effective even if the low dense first electrochromic layer 31 has only a thin thickness, and this fact is advantageous in terms of manufacturing the first electrochromic layer 31.

A second exemplary embodiment will be described with reference to FIG. 1B. An electrochromic element according to the present exemplary embodiment is similar to the electrochromic element according to the first exemplary embodiment, except that the electrochromic element according to the present exemplary embodiment additionally includes a third electrochromic layer. In FIG. 1B, the third electrochromic layer is indicated by the reference numeral 33. In the electrochromic element according to the present exemplary embodiment, the third electrochromic layer 33 is in contact with the second-electrode side of the second electrochromic layer 32, in addition to the structure of the first exemplary embodiment. Accordingly, in the second embodiment, the electrochromic layer includes a plurality of electrochromic layers including a first electrochromic layer, a second electrochromic layer and a third electrochromic layer stacked upon each other.

The refractive indices of the respective layers satisfy the relationships (n0<n1<n2) and (n2>n3>n4). In these relationships, "n0" represents the refractive index of the first electrode 2, and "n4" represents the refractive index of the electrolyte layer 4. In addition, n1 represents a refractive index of the first electrochromic layer 31, n2 represents a refractive index of the second electrochromic layer 32, and n3 represents a refractive index of the third electrochromic layer 33.

This means that the value of the refractive index of the third electrochromic layer 33 is a value between the value of the refractive index of the electrolyte layer 4 and the value of the refractive index of the second electrochromic layer 32.

Therefore, the value of the refractive index of the third electrochromic layer 33 is closer to the value of the refractive index of the electrolyte layer 4 than the value of the refractive index of the second electrochromic layer 32.

Accordingly, the reflectance on the boundary surface between the electrolyte layer 4 and the third electrochromic layer 33 is lower than the reflectance on the boundary surface between the electrolyte layer 4 and the second electrochromic layer 32 if the electrolyte layer 4 is directly disposed on the second electrochromic layer 32.

The electrochromic element according to the present exemplary embodiment is further effective, since not only the reflectance on the boundary surface between the electrochromic layer 3 and the first electrode 2 but also the reflectance on the boundary surface between the electrochromic layer 3 and the electrolyte layer 4 can be reduced, and therefore it is possible to improve the transmittance of visible light through the entire electrochromic element and prevent interference of reflected light with incident light, compared to the electrochromic element according to the first exemplary embodiment.

The first substrate 1 and the second substrate 6 in the electrochromic element according to the exemplary embodiments of the present invention may be embodied by any substrates capable of allowing visible light to transmit therethrough. Examples thereof include a glass plate, and a synthetic resin plate such as a plastic plate and polyimide.

The electrolyte layer 4 may be made of a material capable of supplying ions to the electrochromic layer 3. Examples thereof include: a solid electrolyte such as tantalum oxide, silicon oxide, aluminum oxide, niobium oxide, and zirconium oxide; a liquid electrolyte; and a polyelectrolyte.

The first electrode 2 and the second electrode 5 may be embodied by low electrically resistive materials. Examples thereof include indium tin oxide (ITO), tin oxide (SnO2), zinc oxide (ZnO), and polyethylene dioxy thiophene (PEDOT) which is a conductive polymer film.

When the first electrode layer 2 is made of ITO or indium zinc oxide (IZO), the value of n0 is approximately 1.9 to 2.1. Further, when the electrolyte layer 4 is made of a polymer solid electrolyte, the value of n4 may be approximately 1.5. On the other hand, the value of n2 may be approximately 2.0 to 2.5.

Then, the electrochromic element is formed so that n1 and n3 respectively have values satisfying the relationships (n0<n1<n2) and (n2>n3>n4).

The values of n1 and n3 may have gradient within each layer, as long as the values fall within the above-described range. For example, the first electrochromic layer 31 may be formed so that the density of the titanium oxide thereof is getting smaller as the distance to the first electrode 2 is getting closer.

The respective layers of the electrochromic element according to the exemplary embodiments of the present invention are formed by a thin film formation method such as the electron beam evaporation method, the reactive ion plating method, the reactive sputtering method, the sputtering method, the chemical vapor deposition (CVD) method, the anodic oxidation method, and the spinner method.

The layer thicknesses of the first and the third electrochromic layers 31 and 33 according to the exemplary embodiments of the present invention is not specially limited but may be equal to 5 nm or thicker.

Further, the thickness of the second electrochromic layer 32 may be greater than the thickness of the first electrochromic layer 31.

Further, the thickness of the second electrochromic layer 32 may be greater than the thickness of the third electrochromic layer 33.

The electrochromic layer 3 included in the electrochromic element according to the exemplary embodiments of the present invention may include four or more titanium oxide layers. Further, the electrochromic layer 3 made of titanium oxide in the exemplary embodiments of the present invention may include a small amount of another material or element.

Further, the exemplary embodiments of the present invention can be applied to a complementary electrochromic element including an oxidative-coloration electrochromic layer disposed between the electrolyte layer 4 and the second electrode 5.

A use application of the electrochromic element according to the exemplary embodiments of the present invention will be described. The electrochromic element according to the exemplary embodiments of the present invention is applicable to an imaging apparatus including an imaging optical system.

The electrochromic element according to the exemplary embodiments of the present invention can be used to limit the light amount of light received by an image sensor included in an imaging apparatus. The light amount of light received by an image sensor is limited when the light transmits through the electrochromic element.

The electrochromic element according to the exemplary embodiments of the present invention may be mounted at any place in an imaging apparatus. More specifically, the electrochromic element may be mounted in front of an image sensor or inside a lens unit, or may be disposed in front of a lens unit to be used as a filter therefore.

The imaging optical system according to the embodiment of the present invention comprises plural lenses and the electrochromic element. The electrochromic is between the lenses or outside of the lenses.

Examples according to the present invention are described. Physical property evaluation was conducted. An ITO layer was formed on a glass substrate (the first substrate) as the first electrode, and a titanium oxide layer was formed thereon. The thus-prepared titanium oxide layer was compared with another titanium oxide having a different density, whereby the refractive indices thereof were compared with each other.

Figure 3A:
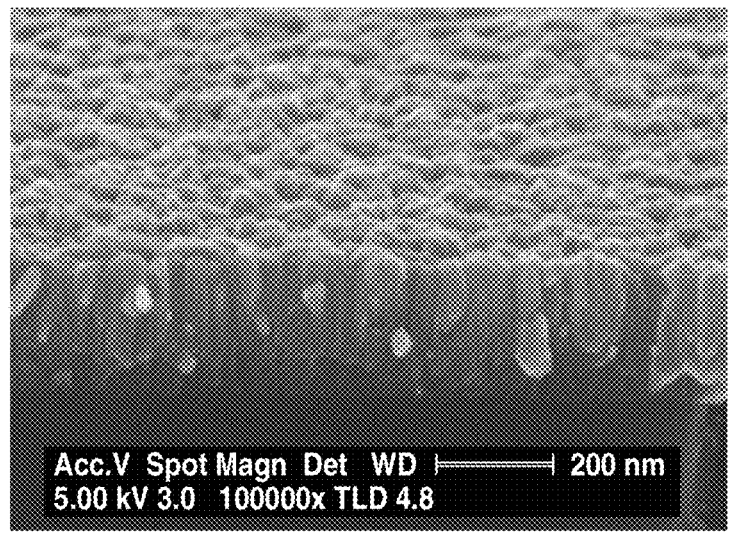
FIGS. 3A and 3B are scanning electron microscope (SEM) images of a titanium oxide layer 1 and a titanium oxide layer 2 according to the exemplary embodiments of the present invention.
Figure 3B:
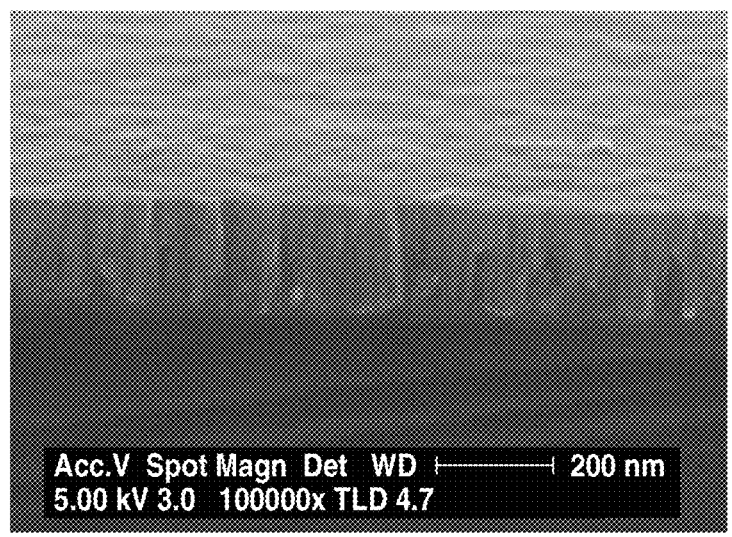

First, the two kinds of titanium oxide layers formed by the reactive radio-frequency (RF) sputtering film formation method is referred to as "titanium oxide layer 1" and "titanium oxide layer 2", and FIGS. 3A and 3B illustrate the SEM photographs thereof. The photographs of FIGS. 3A and 3B are SEM photographs of the respective layers taken obliquely from above. FIG. 3A is an SEM (scanning electron microscope) photograph of the titanium oxide layer 1, and the FIG. 3B is an SEM photograph of the titanium oxide layer 2.

As it can be appreciated from the SEM photographs, the photograph of FIG. 3A shows that the titanium oxide layer 1 has a rough surface that includes voids in certain places. Compared to layer 1, the photograph of 3B shows that the titanium oxide layer 2 has a substantially planar and smooth surface with no striking void.

Figure 4:
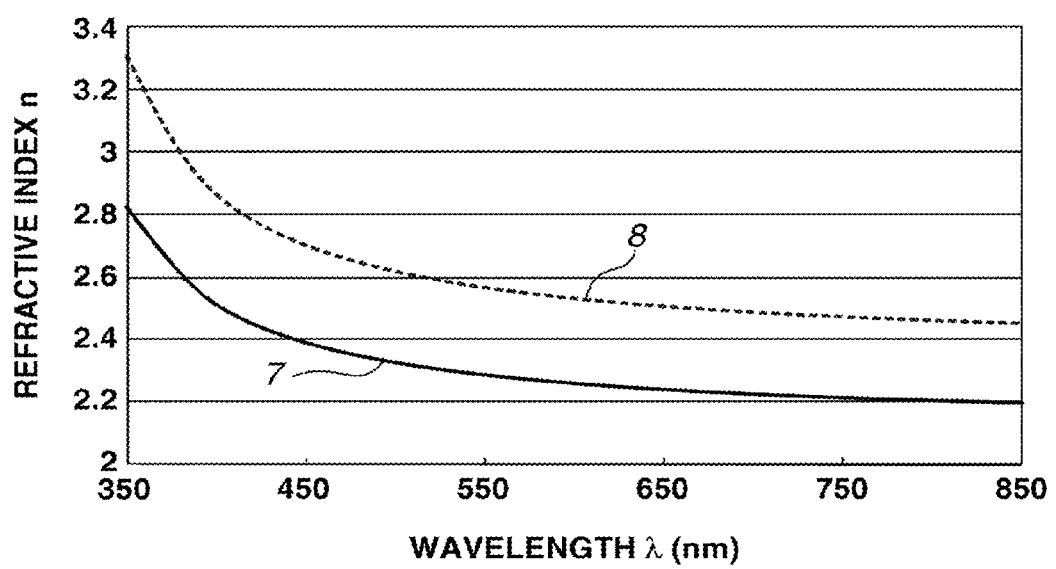
FIG. 4 illustrates optical characteristics of a titanium oxide layer 1 and a titanium oxide layer 2 according to the exemplary embodiments of the present invention.

In this manner, these photographs clearly indicate that the titanium oxide layer 1 is less dense than the titanium oxide layer 2. Further, the refractive indices of the respective layers were obtained by the spectral ellipsometry method, and the refractive indices of the titanium oxide layer 1 and the titanium oxide layer 2 were 2.29 and 2.57, respectively. The calculation of the refractive indices was conducted based on the data at wavelength 550 nm. FIG. 4 illustrates the relationships between the refractive indices and the wavelength in the visible range. The solid line 7 indicates the data of the titanium oxide layer 1, and the broken line 8 indicates the data of the titanium oxide layer 2. FIG. 4 clearly reveals that the refractive index of the titanium oxide layer 2 is higher throughout the entire visible light range.

Figure 5A:
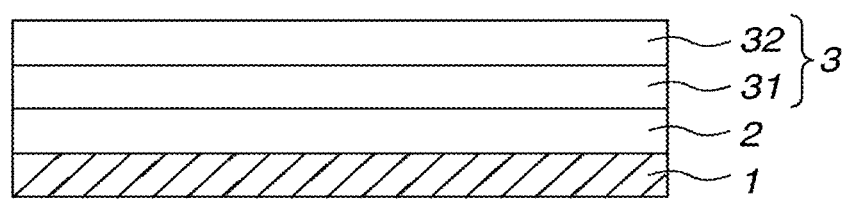
FIGS. 5A and 5B are conceptual diagrams illustrating the cross-sections of samples 1 and 2 according to the exemplary embodiments of the present invention.

A first practical example is now described. A sample 1 was prepared in the following manner. For the sample 1, a glass substrate was used as the first substrate, and then, an ITO electrode (film thickness: 100 nm, refractive index: 2.0 to 2.1) was formed on the glass substrate as the first electrode. A first titanium oxide layer (film thickness: 50 nm) and a second titanium oxide layer (film thickness: 150 nm) were sequentially formed on the first electrode as the electrochromic layer. FIG. 5A illustrates the structure of the sample 1. As illustrated in FIG. 5A, the electrochromic layer 3 includes a first electrochromic layer 31 and a second electrochromic layer 32 stacked upon each other.

Figure 5B:
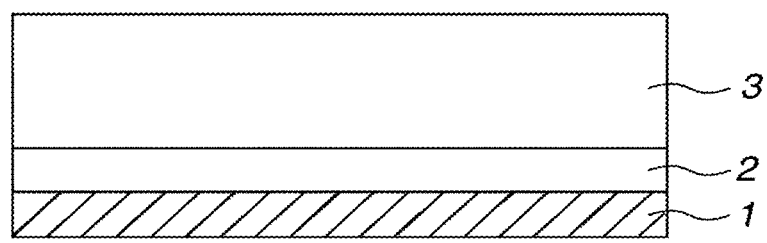

A comparative example 1 is now described. A sample 2 was prepared in the following manner. For the sample 2, as compared to sample 1, one of the titanium oxide layers was omitted, and a single titanium oxide layer was formed so as to have a thickness of 200 nm, and except for them, the same layers were formed as those of the sample 1. FIG. 5B illustrates the structure of the sample 2.

In other words, FIG. 5A illustrates the structure of the sample 1 prepared as the first practical example, and FIG. 5B illustrates the structure of the sample 2 prepared as the comparative example 1.

Figure 6:
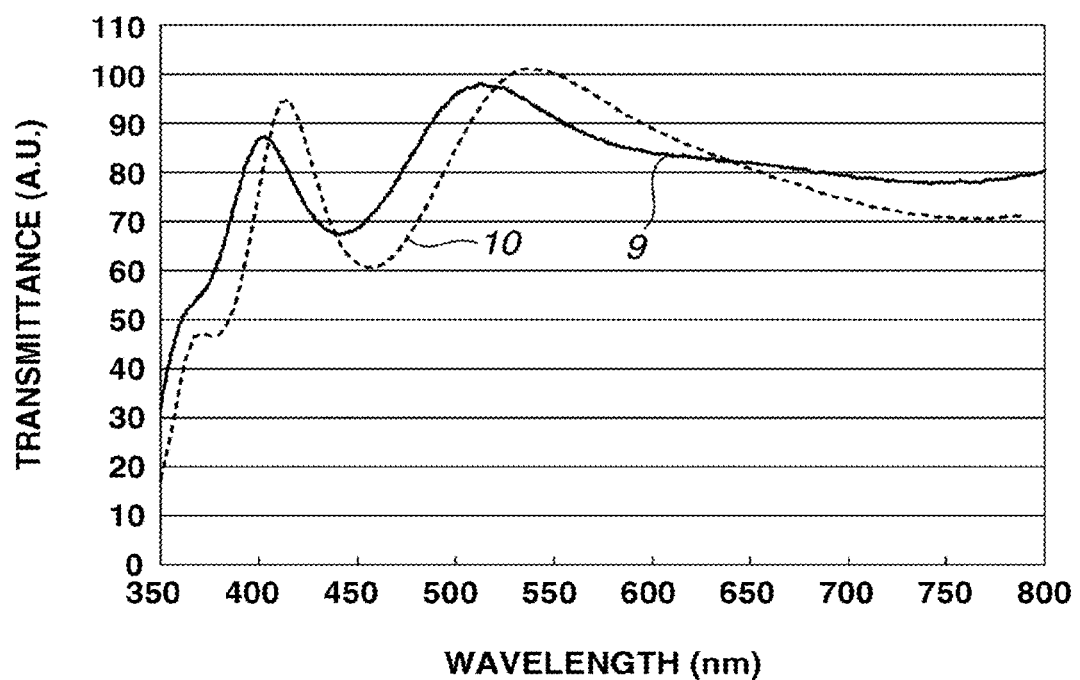
FIG. 6 illustrates the transmitted light spectra of the sample 1 and the sample 2 according to the exemplary embodiments of the present invention.

Referring to FIG. 6, the solid line 9 and the broken line 10 indicate the result of measurement of the transmittance of visible light through the respective prepared layer structures.

The solid line 9 indicates the data of the sample 1, and the broken line 10 indicates the data of the sample 2. It is evident that the data of the sample 1 does not have transmittance over 100%, owing to the suppression in the reflection between the layers. On the other hand, the data of the sample 2 has transmittance over 100% in some region, due to the insufficient suppression in the reflection. Because of the larger interference of several times reflected light and incident light, transmittance of light is enhanced or de-enhanced at specific wavelength largely. This is explained as follows. The amount of incident light is assumed to be 100. The incident light is divided into transmitted light and reflected light. In the reflected light, there is light which reflects several times in the layers and travels in the same direction as the transmitted light. When the reflected light travels with the transmitted light of other incident light at the same time in the same direction, the transmitted light at that moment is to be able to take the value more than 100 in observation.

Thus, FIG. 6 evidences that the layer structure of the sample 1 can reduce the reflectance between the electrochromic layer and the first electrode at predetermined wavelengths.

More specifically, the transmittance through the sample 2, which was prepared by forming the titanium oxide layer 2 (film thickness: 200 nm) on the ITO layer (thickness: 100 nm, refractive index: 2.0 to 2.1) as the first electrode as illustrated in FIG. 5B, was measured, and was compared with the result of the sample 1.

FIG. 6 illustrates the result of the measurement of the transmittance of light through the samples 1 and 2 at wavelengths 350 nm to 800 nm. Although wavelength dependence of transmittance cannot be eliminated due to thin-film interference light, the sample 1 has a maximum film transmittance Tmax of approximately 98% ($\lambda$=514 nm) and a minimum film transmittance Tmin of approximately 78% ($\lambda$=755 nm) for light of wavelengths 500 nm to 800 nm. On the other hand, the sample 2 has a maximum film transmittance Tmax of approximately 101% ($\lambda$=540 nm) and a minimum film transmittance Tmin of approximately 71% ($\lambda$=765 nm) for light of wavelengths 500 nm to 800 nm.

The comparison of the wavelength dependence of transmittance, which is an object of the exemplary embodiments of the present invention, has reached the result that the difference $\Delta T$ between the maximum transmittance and the minimum transmittance is approximately 20% for the layer structure of the sample 1, and is approximately 30% for the layer structure of the sample 2. Thus it is confirmed that the sample 1 can reduce the wavelength dependence of transmittance by 10%.

In this way, this comparison can prove the excellent transparency of the layer structure of the sample 1.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-247858 filed Nov. 4, 2010, which is hereby incorporated by reference herein in its entirety.

What is claimed is:

1. An electrochromic element comprising:

a pair of transparent electrodes; and an electrolyte layer and an electrochromic layer disposed between the pair of transparent electrodes, wherein the electrolyte layer is disposed between the electrochromic layer and one of the transparent electrodes, wherein transmittance of light is changed by a voltage applied to the pair of transparent electrodes, wherein the electrochromic layer includes a first electrochromic layer and a second electrochromic layer stacked upon each other, wherein both the first and second electrochromic layers are made of titanium oxide, wherein the first electrochromic layer is in contact with the one of the pair of transparent electrodes, wherein the second electrochromic layer is in contact with an electrolyte-layer side of the first electrochromic layer, and wherein, when n0 represents a refractive index of the transparent electrode in contact with the first electrochromic layer, n1 represents a refractive index of the first electrochromic layer, and n2 represents a refractive index of the second electrochromic layer, a relationship n0<n1<n2 is satisfied.

2. The electrochromic element according to claim 1, wherein a thickness of the first electrochromic layer is thinner than a thickness of the second electrochromic layer.

3. An electrochromic element comprising:
a pair of transparent electrodes;
an electrolyte layer; and
a plurality of electrochromic layers including a first electrochromic layer, a second electrochromic layer and a third electrochromic layer stacked upon each other,
wherein the electrolyte layer is disposed adjacent a first one of the transparent electrodes,
wherein transmittance of light is changed by a voltage applied to the pair of transparent electrodes,
wherein all of the first, second and third electrochromic layers are made of titanium oxide,
wherein the first electrochromic layer is in contact with a second one of the transparent electrodes,
wherein the second electrochromic layer is in contact with an electrolyte-layer side of the first electrochromic layer,
wherein the third electrochromic layer is in contact with an electrolyte-layer side of the second electrochromic layer, and
wherein, when n0 represents a refractive index of the transparent electrode in contact with the first electrochromic layer, n1 represents a refractive index of the first electrochromic layer, n2 represents a refractive index of the second electrochromic layer, n3 represents a refractive index of the third electrochromic layer, and n4 represents a refractive index of the electrolyte layer, relationships
$n0 < n1 < n2$ and
$n2 > n3 > n4$
are satisfied.

4. The electrochromic element according to claim 3, wherein a thickness of the first electrochromic layer is thinner than a thickness of the second electrochromic layer, and
wherein the thickness of the second electrochromic layer is thicker than a thickness of the third electrochromic layer.

5. A method of forming an electrochromic element, comprising:
forming a pair of transparent electrodes; and
forming an electrolyte layer and an electrochromic layer disposed between the pair of transparent electrodes,
wherein the electrolyte layer is disposed between the electrochromic layer and one of the transparent electrodes,
wherein transmittance of light is changed by a voltage applied to the pair of transparent electrodes,
wherein the electrochromic layer includes a first electrochromic layer and a second electrochromic layer stacked upon each other,
wherein both the first and second electrochromic layers are made of titanium oxide,
wherein the first electrochromic layer is in contact with the one of the pair of transparent electrodes,
wherein the second electrochromic layer is in contact with an electrolyte-layer side of the first electrochromic layer, and
wherein, when n0 represents a refractive index of the transparent electrode in contact with the first electrochromic layer, n1 represents a refractive index of the first electrochromic layer, and n2 represents a refractive index of the second electrochromic layer, a relationship $n0 < n1 < n2$ is satisfied.

* * * * *